United States Patent
Ercolano

(10) Patent No.: US 7,475,935 B2
(45) Date of Patent: Jan. 13, 2009

(54) AUTOMOTIVE DOOR INSIDE PANEL EQUIPPED WITH SUNSHADE

(75) Inventor: Tony Ercolano, Wavignies (FR)

(73) Assignee: Faurecia Interieur Industrie, Nanterre (FR)

( * ) Notice: Subject to any disclaimer, the term of this patent is extended or adjusted under 35 U.S.C. 154(b) by 7 days.

(21) Appl. No.: 11/883,643

(22) PCT Filed: Mar. 2, 2006

(86) PCT No.: PCT/FR2006/000471

§ 371 (c)(1),
(2), (4) Date: Aug. 3, 2007

(87) PCT Pub. No.: WO2006/092508

PCT Pub. Date: Sep. 8, 2006

(65) Prior Publication Data

US 2008/0157559 A1    Jul. 3, 2008

(30) Foreign Application Priority Data

Mar. 4, 2005   (FR) .................................... 05 02213

(51) Int. Cl.
*B60J 5/00* (2006.01)
*B60J 1/20* (2006.01)

(52) U.S. Cl. .................................. 296/146.7; 296/97.8

(58) Field of Classification Search ................ 296/97.1, 296/97.4, 97.8, 97.9, 146.7, 1.08, 146.1, 296/146.2, 191, 39.1, 190.1

See application file for complete search history.

(56) References Cited

U.S. PATENT DOCUMENTS

| 5,089,912 A | 2/1992 | Simin | |
| 7,234,756 B2 * | 6/2007 | Lynam et al. | 296/146.5 |
| 7,401,840 B2 * | 7/2008 | Schnoblen et al. | 296/143 |

FOREIGN PATENT DOCUMENTS

| EP | 0 027 864 A1 | 5/1981 |
| EP | 0 985 567 A1 | 3/2000 |
| EP | 1 302 347 A1 | 4/2003 |

* cited by examiner

*Primary Examiner*—Glenn Dayoan
*Assistant Examiner*—Melissa A Black
(74) *Attorney, Agent, or Firm*—Young & Thompson

(57) ABSTRACT

A door inside panel includes a panel body (12) having a first fixing device (18) and an upper pelmet (14) arranged proximate the upper edge of the panel body (12) and housed in a cavity (16) which opens on the visible side of the inside panel, the pelmet (14) including a second fixing device (20). The fixing devices (18, 20) have co-operating positions wherein they cause the pelmet (14) to be fixed to the panel body (12), a first position wherein the entire edge of the pelmet (14) is in contact with the panel body, and a second position wherein the edge of the pelmet (14) is spaced apart from the panel body (12) proximate the upper edge and forms a slot (28). The invention is suitable for an automotive door.

19 Claims, 1 Drawing Sheet

AUTOMOTIVE DOOR INSIDE PANEL EQUIPPED WITH SUNSHADE

The present invention relates to an automotive door inside panel which is or is not to contain a sunshade.

The doors of motor vehicles have side windows, and a comfort factor provided for the occupants of a motor vehicle is the arrangement of a sunshade on the side windows. Because there is a basic motor vehicle model without a sunshade and a model equipped with a sunshade, it is necessary to produce inside door panels, or at least parts of such panels, in two versions, one with a sunshade and the other without a sunshade. In particular, the version without a sunshade must not exhibit a slot for the passage of a screen which is not present in that version.

In order to solve that problem there is already known, according to document EP-0 882 609, a vehicle door equipped with a sunshade which is arranged inside an inside door panel and which passes through the opening provided for the window of the door. Consequently, the screen of the sunshade is adjacent to the side window. This solution has the advantage that it allows a door to be produced with or without a sunshade without major modification of the door panel. However, in that system, because the screen of the sunshade is in contact with the window, problems of mutual dragging and friction occur when the screen or the window is moved, because those two elements do not move together but separately. That system does not give the necessary reliability.

Also known, according to document EP-0 985 567, is a motor vehicle door equipped with a sunshade which is integrated into the upper part of the door panel by cutting away that upper part in order to incorporate a sunshade. A modification of the door panel or of part thereof is therefore necessary in order for it to include a slot for passage of the sunshade. That solution requires at least one additional step to be carried out on the panels that are to accommodate the sunshades. The quality obtained is not always perfect, so that it is sometimes necessary to add trim elements. In addition, the cost of a door equipped with a sunshade is increased by the additional operations that are necessary.

There is also known, according to document EP-1 302 347, a motor vehicle door equipped with an integrated sunshade; the incorporation of the sunshade into the upper part of the inside door panel requires the specific production of a crosspiece of the door. However, that production does not resolve the problem of the two versions of inside door panels, or at least of parts of such panels, one with a sunshade and the other with neither a sunshade nor a slot. The disadvantage of such a solution is the cost of developing the two versions and the cost of the specific different equipment that must be used.

The invention relates to the solution to the above-mentioned problem, and its object is to produce a door panel that does not have any of the above disadvantages, that is to say that does not require the manufacture of two separate versions, does not require a visible modification of the door panel, and that does not give rise to technical problems during operation, such as contact between the screen and the window.

More precisely, according to the invention, in the case of an inside door panel having a fascia or insert in the vicinity of most of the upper edge of the door panel, the fascia is able, without modification, to occupy two positions, in one of which it is contiguous with the body of the door panel and in the other of which it delimits, with the remainder of the door panel, a slot through which a sunshade screen accommodated inside the door panel can pass, without modification of the door panel.

More precisely, the invention relates to an automotive inside door panel of the type comprising a panel body which is to be fixed to a door body and which, in the use position, extends in a substantially vertical plane and has an upper edge which is to be adjacent to a window, the panel body comprising a first fixing device and an upper fascia arranged in the vicinity of most of the upper edge of the panel body, the fascia being accommodated in a cavity in the panel body which opens on the visible side of the inside panel, both towards the upper edge of the panel body and towards the inside in the use position in a motor vehicle, the fascia comprising a second fixing device, the first and second fixing devices being intended to cooperate in order to fix the fascia to the panel body. According to the invention, the first and second fixing devices have two cooperating positions in which they fix the fascia to the panel body, a first position in which the whole of the edge of the fascia is virtually in contact with the panel body, both in the plane of the panel body and in the vicinity of its upper edge, and a second position in which the edge of the fascia is virtually in contact with the panel body in the plane of that body but is at a distance from the panel body in the vicinity of its upper edge, so that a slot is delimited between the fascia edge portion close to the upper edge and the upper edge of the panel body.

In the preferred embodiment, the inside panel comprises a retractable sunshade which is accommodated in the cavity and the screen of which passes through the slot.

In an advantageous embodiment, the sunshade has a support which forms a spacer between the fascia and the panel. In variants, the sunshade is fixed to the fascia, or it is fixed to the inside panel, inside the cavity.

The sunshade preferably has a pull bar which is to cover the slot when the screen of the sunshade is in the retracted position.

In an embodiment, the two fixing positions of the panel body and of the fascia differ by a translational displacement of the fascia.

In another embodiment, the two fixing positions of the panel body and of the fascia differ by a rotational displacement of the fascia about a centre of rotation close to the fascia edge that is adjacent to the plane of the panel body.

In an embodiment, the cooperation between the first and second fixing devices is inseparable.

In another embodiment, the cooperation between the first and second fixing devices is removable so that a sunshade can be fitted at a later date or can be replaced.

The fascia preferably constitutes an insert covered with a material that matches the material of the vehicle seats.

Other features and advantages of the invention will be better understood upon reading the following description of an exemplary embodiment, which makes reference to the accompanying drawings, in which.

Figure 1:
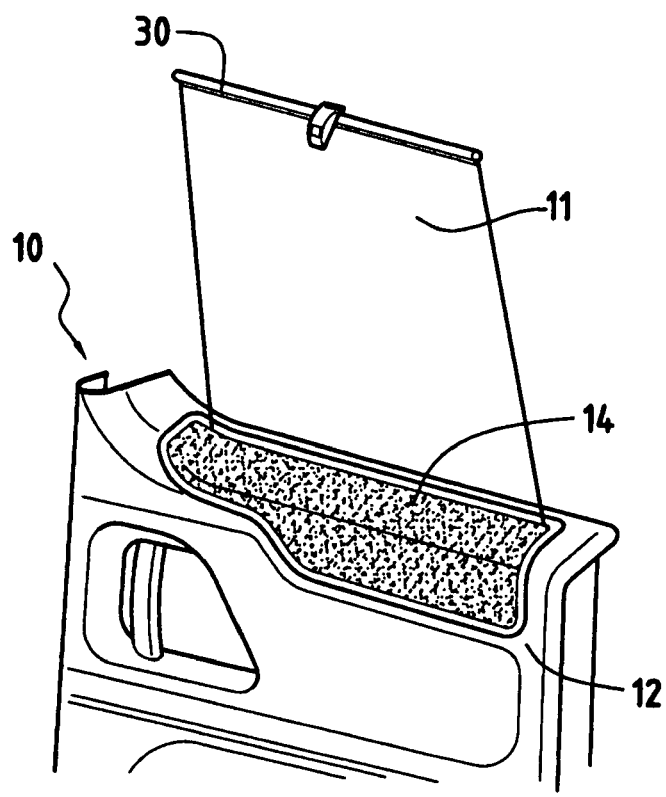
FIG. 1 shows a perspective view of the upper part of an automotive door inside panel.

FIG. 1 is a partial view, in perspective, of an inside door panel which substantially comprises a panel body carrying numerous functional elements, especially door opening control elements, window regulator elements, etc., and which is equipped in its upper part with a fascia 14. In the embodiment shown in FIG. 1, the fascia 14 is constituted by an insert which can be, for example, covered with leather or with a fabric that matches the inside of the associated motor vehicle.

Reference numeral 11 denotes a sunshade screen shown withdrawn above the panel, the screen normally assuming that position only inside a finished motor vehicle.

Figure 2:
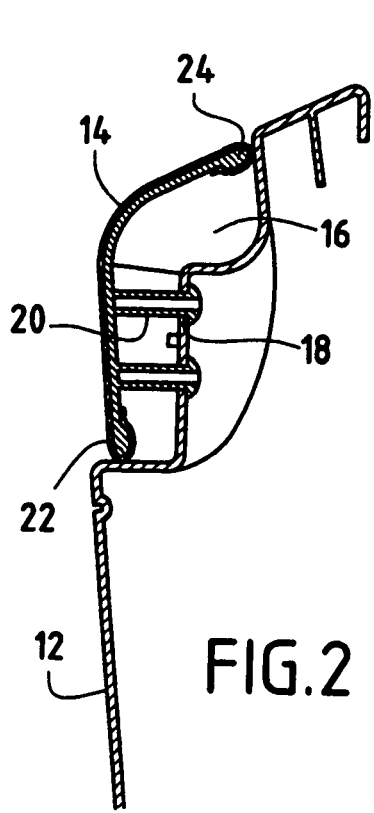
FIG. 2 shows a transverse section of the upper part of the door panel of FIG. 1, without a sunshade.

FIG. 2 shows a section of the inside door panel of FIG. 1. It will be seen that the panel body 12, which carries the fascia 14, delimits a cavity 16 with the fascia. The fascia is held on the door panel by the cooperation of a first fixing device 18, integral with the panel body 12, and a second fixing device 20 integral with the fascia 14, so that the fascia is in contact with the panel body 12 both at its lower edge 22, virtually in the vertical plane of the body 12, and at its upper edge 24. In the region of the edges 22 and 24, in this embodiment, the fascia is offset slightly relative to the surface of the panel body 12. This offset is not a disadvantage, however, because the fascia 14 is generally constituted by an insert which must be readily distinguished from the remainder of the door panel.

In the example shown, the second fixing device 20 is constituted by two hollow cylindrical legs moulded in one piece with the support of the fascia 14, and the first fixing device 18 is constituted by two holes in the panel body 12, in the cavity 16. The first and second fixing devices are made to cooperate by forming snap heads at the ends of the legs, against the rear face of the panel body 12. In a variant in which the fascia must be removable, cooperation can be effected by inserting at the end of each leg a screw which expands and becomes wedged in the corresponding hole. Other devices, such as a clip having two cooperating positions, are also suitable.

Figure 3:
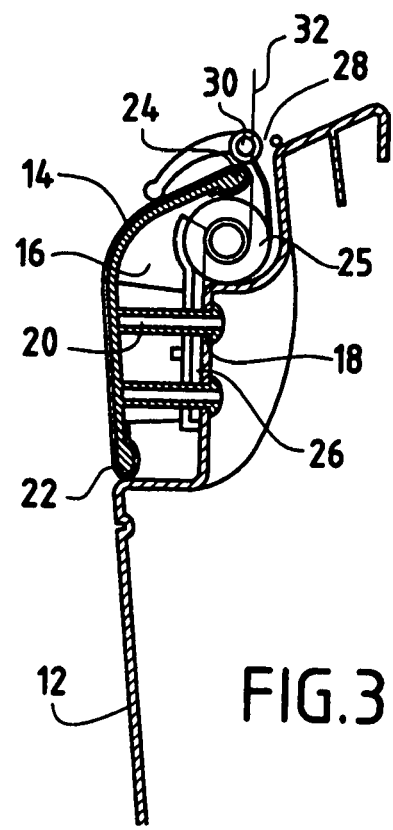
FIG. 3 shows a section analogous to that of FIG. 2 but in which the door panel comprises a sunshade, in an embodiment of the invention.

FIG. 3 shows how a sunshade can be mounted in the inside door panel of FIGS. 1 and 2, without modification of either the panel or the fascia.

More precisely, in FIG. 3, prior to assembly, a support 26 of a sunshade 25 is placed between the panel body and the fascia in the region of their fixing devices 18, 20, and it is held on the panel body by the first and second fixing devices of the fascia. Given the thickness of the support 26, it constitutes a spacer which offsets the fascia 14 slightly relative to the panel body 12, so that the lower edge 22 of the fascia is now located virtually in the vertical plane of the panel body 12. The upper edge 24, on the other hand, has moved away from the panel body and delimits a slot 28 with the upper edge thereof. The slot 28 permits the passage of the screen of the sunshade 25, the outside end of the screen being held by a gripper bar 30, which is also shown in FIG. 1. The position of the extended screen is shown by the broken line 32.

It will be noted that, in this embodiment, the fascia 14 is mounted on the panel body 12 in the same manner whether the sunshade is present or not. The upper edge 24 of the fascia 14 is either wholly in contact with the panel body 12, in the absence of a sunshade, or at a distance from the panel body 12 in order to form the slot 28, in the presence of the sunshade.

A system has been described in which the support of the sunshade forms a spacer which automatically ensures that the fascia 14 is positioned in the desired position. However, that is only a particularly advantageous embodiment, because other embodiments exist. For example, it is also possible to mount the sunshade directly either on the panel body 12, towards the cavity 16, or on the fascia 14, again towards the cavity 16, by means of a specific fixing device.

A device has been described in which the positions of the fascia 14 corresponding to the two versions differ by a translational displacement according to a horizontal axis. However, it is also possible to envisage a rotational displacement. For example, with suitable modification of the support 26 of the sunshade 25, when two superposed fixing devices are used between the fascia and the door panel, the sunshade support 26 can be placed solely at the level of the upper fixing device so that, instead of being displaced in translation, the fascia 14 pivots. With or without a sunshade, the lower edge 22 is always located virtually at the level of the plane of the panel body 12. The upper edge 24, on the other hand, is either against the door panel 12 or at a distance therefrom, depending on whether the sunshade is incorporated or not. In a variant, the support 26 can be tapered, its thickness diminishing from top to bottom, so that the fascia has two positions in which its lower edge 22 is always at the level of the plane of the panel body 12.

In the example described, cooperation between the first and second fixing devices can be inseparable. However, it may also be advantageous for that cooperation to be removable, for example so that a sunshade may be replaced or repaired, or so that a version without a sunshade may be provided with one at a later date.

FIG. 1 shows that the insert has a shape which bends upwards towards one end. The upper limit between the fascia 14 and the panel body 12 is preferably located in an almost vertical plane, so that the screen 11 is able to keep an almost flat shape and the pull bar 30 can be straight. However, if the slot has a shape curved in a horizontal cutting plane, the pull bar 30 can be adapted to that shape.

The invention claimed is:

1. Automotive inside door panel of the type comprising:
   a panel body (12) which is to be fixed to a door body and which, in the use position, extends in a substantially vertical plane and has an upper edge that is to be adjacent to a window, the panel body (12) comprising a first fixing device (18), and
   an upper fascia (14) arranged in the vicinity of most of the upper edge of the panel body (12), the fascia (14) being accommodated in a cavity (16) in the panel body which opens on the visible side of the inside panel, both towards the upper edge of the panel body (12) and towards the inside in the use position in a vehicle, the fascia (14) comprising a second fixing device (20),
   the first and second fixing devices (18, 20) being intended to cooperate in order to fix the fascia (14) to the panel body (12),
   characterised in that the first and second fixing devices (18, 20) have two cooperating positions in which they fix the fascia (14) to the panel body (12), a first position in which the whole edge of the fascia (14) is virtually in contact with the panel body, both in a plane of the panel body (12) and in the vicinity of its upper edge, and a second position in which the edge of the fascia (14) is virtually in contact with the panel body in the plane of that body but is at a distance from the panel body (12) in the vicinity of the upper edge, so that a slot (28) is delimited between the edge part of the fascia (14) close to the upper edge and the upper edge of the panel body (12).

2. Panel according to claim 1, characterised in that the inside panel comprises a retractable sunshade (25) accommodated in the cavity (16).

3. Panel according to claim 2, characterised in that the sunshade (25) is fixed to the fascia (14).

4. Panel according to claim 2, characterised in that the sunshade (25) is fixed to the panel body (12).

5. Panel according to claim 2, characterised in that the sunshade (25) has a support (26) which forms a spacer between the fascia (14) and the panel body (12).

6. Panel according to claim 2, characterised in that the sunshade (25) has a pull bar (30) that is to cover the slot (28) when the screen of the sunshade (25) is in the retracted position.

7. Panel according to claim 1, characterised in that the two fixing positions of the panel body (12) and of the fascia (14) differ by a translational displacement of the fascia (14).

8. Panel according to claim 1, characterised in that the two fixing positions of the panel body (12) and of the fascia (14) differ by a rotational displacement of the fascia (14) about a centre of rotation close to the edge of the fascia (14) adjacent to the plane of the panel body (12).

9. Panel according to any claim 1, characterised in that the cooperation of the first and second fixing devices (18, 20) is removable.

10. Panel according to claim 1, characterised in that the fascia (14) constitutes an insert covered in a material that matches the material of the vehicle seats.

11. Panel according to claim 3, characterised in that the sunshade (25) has a support (26) which forms a spacer between the fascia (14) and the panel body (12).

12. Panel according to claim 4, characterised in that the sunshade (25) has a support (26) which forms a spacer between the fascia (14) and the panel body (12).

13. Panel according to claim 3, characterised in that the sunshade (25) has a pull bar (30) that is to cover the slot (28) when the screen of the sunshade (25) is in the retracted position.

14. Panel according to claim 4, characterised in that the sunshade (25) has a pull bar (30) that is to cover the slot (28) when the screen of the sunshade (25) is in the retracted position.

15. Panel according to claim 5, characterised in that the sunshade (25) has a pull bar (30) that is to cover the slot (28) when the screen of the sunshade (25) is in the retracted position.

16. Panel according to claim 2, characterised in that the two fixing positions of the panel body (12) and of the fascia (14) differ by a translational displacement of the fascia (14).

17. Panel according to claim 2, characterised in that the two fixing positions of the panel body (12) and of the fascia (14) differ by a rotational displacement of the fascia (14) about a centre of rotation close to the edge of the fascia (14) adjacent to the plane of the panel body (12).

18. Panel according to claim 2, characterised in that the cooperation of the first and second fixing devices (18, 20) is removable.

19. Panel according to claim 2, characterised in that the fascia (14) constitutes an insert covered in a material that matches the material of the vehicle seats.

* * * * *